(12) United States Patent
Herren et al.

(10) Patent No.: US 11,230,129 B2
(45) Date of Patent: Jan. 25, 2022

(54) TRANSFER MEDIA FOR TRANSFERRING FUNCTIONAL ACTIVE INGREDIENTS

(71) Applicant: SIHL GmbH, Duren (DE)

(72) Inventors: Dominic Herren, Bern (CH); Daniel Loosli, Ittigen (CH); Lisa Stuber, Worb (CH); Steffen Ohr, Sursee (CH)

(73) Assignee: Sihl GmbH, Düren (DE)

( * ) Notice: Subject to any disclaimer, the term of this patent is extended or adjusted under 35 U.S.C. 154(b) by 0 days.

(21) Appl. No.: 16/458,362

(22) Filed: Jul. 1, 2019

(65) Prior Publication Data
US 2020/0001641 A1 Jan. 2, 2020

(30) Foreign Application Priority Data
Jul. 2, 2018 (EP) .................... 18181138

(51) Int. Cl.
*B41M 5/03* (2006.01)
*B41M 5/035* (2006.01)
*B41M 5/025* (2006.01)
*B41M 5/41* (2006.01)
*B41M 5/42* (2006.01)
*D06P 5/28* (2006.01)

(52) U.S. Cl.
CPC ........ *B41M 5/0356* (2013.01); *B41M 5/0256* (2013.01); *B41M 5/41* (2013.01); *B41M 5/42* (2013.01); *D06P 5/004* (2013.01)

(58) Field of Classification Search
None
See application file for complete search history.

(56) References Cited

U.S. PATENT DOCUMENTS

| 9,505,256 B2 | 11/2016 | Pal et al. |
| 2008/0229962 A1 | 9/2008 | Shedd et al. |
| 2016/0243870 A1 | 8/2016 | Fu et al. |
| 2018/0001685 A1 * | 1/2018 | Alfekri .................. D06P 5/009 |
| 2018/0154666 A1 | 6/2018 | Schmidt et al. |

FOREIGN PATENT DOCUMENTS

| EP | 3098085 A1 | 11/2016 |
| WO | 2013095373 A1 | 6/2013 |
| WO | 2015069255 A1 | 5/2015 |
| WO | WO-2018050475 A1 * | 3/2018 ............ C04B 41/65 |
| WO | 2018106449 A1 | 6/2018 |

* cited by examiner

*Primary Examiner* — Erica S Lin
(74) *Attorney, Agent, or Firm* — The Webb Law Firm (57) ABSTRACT

The present invention relates to transfer media for transferring a functional active ingredient to a surface of an article by means of heat, to methods for preparing such transfer media and for providing of a surface of an article with a functional active ingredient. The transfer media can be used in various technical fields.

19 Claims, 4 Drawing Sheets

TRANSFER MEDIA FOR TRANSFERRING FUNCTIONAL ACTIVE INGREDIENTS

CROSS-REFERENCE TO RELATED APPLICATION

This application claims priority to European Patent Application No. 18 181 138.1 filed Jul. 2, 2018, the disclosure of which is hereby incorporated by reference in its entirety.

BACKGROUND OF THE INVENTION

Field of the Invention

The present invention relates to transfer media for transferring a functional active ingredient to a surface of an article by means of heat, to methods for preparing such transfer media and for providing a surface of an article with a functional active ingredient as well as to the use of such transfer media in different technical fields.

Technical Considerations It is often desirable to provide the surface of articles of various technical fields, such as clothing, furniture, glassware, sanitary items, electrical appliance, vehicles, etc., with a certain functional property such as abrasion-resistance, water-repellency, UV-resistance and/or anti-microbial properties. A common method for doing so is to incorporate a functional active ingredient providing said desired functional property into the base material prior to forming the article from said base material or to apply the functional active ingredient in form of a coherent layer to a surface of said article, e.g. as a paint, lacquer, another kind of coating or by means of an adhesive film or foil.

Depending on the intended use, both approaches suffer from several drawbacks. For instance, incorporating a functional active ingredient throughout the whole base material requires a rather high amount of said material leading to an increase in production costs. Moreover, compatibility problems can occur in the base material formulation, for example in polymerization reactions. In particular, this method is not suitable for modifying the properties of an already existing article and thus usually is not an option for e.g. an end user or consumer in the hobby sector.

The application of the active ingredient as a coherent coating often requires the use of organic solvents. Films and foils often are difficult to apply to curved or structured surfaces. In addition, flaking, chipping or peeling of such coherent layers, which are applied as a separate layer onto the surface of an article, often is a problem.

SUMMARY OF THE INVENTION

Thus, it is an object of the present invention to provide a simple process for furnishing the surface of an article with functional properties, such as abrasion resistance, scratch resistance, water repellency, UV resistance, electrical conductivity, electrical insulation, printability, weather resistance, oxidation resistance, non-stick/anti-adhesive properties, temperature resistance, oil-repellent properties, dirt-repellent properties and/or anti-microbial properties as well as to provide the means for carrying out such process.

This object is met by the transfer medium and methods of the present invention. The transfer medium for transferring a functional active ingredient to the surface of an article according to the present invention is printable with a sublimation ink and comprises a carrier substrate. Said carrier substrate comprises a material selected from the group consisting of paper, films, nonwovens, textiles and combinations thereof and at least one sublimation ink receiving layer formed over at least a part of one surface of the carrier substrate. If a polymeric film is used as carrier substrate, the material will be selected to withstand the elevated temperature of the transfer process. Suitable polymeric materials include e.g. polyethylene terephthalate, polypropylene, polycarbonate, or acrylonitrile butadiene styrene. The carrier substrate typically has a thickness being in the range of from about 10 to about 500 µm, preferably of from about 100 to 300 µm and more preferably of about 200 µm. As used herein, the term "over" as in "formed over" means that the sublimation ink receiving layer may be in direct contact with the carrier substrate or one or more additional layers, including, but not limited to, further sublimation ink receiving layers, barrier layers, such as metallized layers, and/or primer layers, may be present between the carrier substrate and the sublimation ink receiving layer comprising the functional active ingredient. A sublimation ink receiving layer usually forms an outer surface of the transfer medium of the present invention.

The sublimation ink receiving layer comprises at least one pigment and at least one binder as well as at least one functional active ingredient. Said functional active ingredient can be transferred from the sublimation ink receiving layer to the surface of an article combined with the transfer medium in such a way that the article faces the sublimation ink receiving layer of the transfer medium by means of heat. Herein the pigment(s) and binder(s) of the sublimation ink receiving layer are essentially retained over the carrier substrate. While the additional presence of a sublimation dye is not excluded in a sublimation ink receiving layer of the transfer material of the present invention, the functional active ingredient does not represent a sublimation dye having an absorbance maximum at a wavelength $\lambda_{max}$ in the region of from 400 to 700 nm of the electromagnetic spectrum.

The transfer medium of the present invention comprises at least one functional active ingredient which is not a sublimation dye as described above but nevertheless can be transferred under similar conditions to the surface of an article, so as to enable a simple and precise application of one or more functional active ingredients for imparting the desired properties to both flat and contoured surfaces of articles comprising various materials. The use of the transfer medium of the present invention allows the functional active ingredients to be applied to the entire surface of an article or to selected parts of the surface of an article only, thus saving costs and enabling a precise application to desired areas. Furthermore, the transfer medium of the present invention enables both simultaneous and sequential transfer of more than one functional active ingredient and/or sublimation dye.

DESCRIPTION OF THE INVENTION

Transfer printing processes using sublimation inks are known for printing materials such as textiles or rigid bodies that are difficult to print by direct printing processes, e.g. soft, curved and/or uneven surfaces. In such processes, the desired image is reverse printed on a transfer medium, which typically is a flexible, sheet-like material, using a conventional printing technique, e.g. inkjet printing. The printed image is then transferred onto the article to be printed by combining the transfer material and the article, so that the printed surface of the transfer material is facing the surface of the article to be provided with the image, and applying heat and/or pressure thereto. The article typically is made of an organic polymer or is coated with a layer of an organic polymer. The application of heat during the transfer step also temporarily modifies the microstructure at the surface of the article. The heating softens and/or opens the crystalline or molecular structure of the polymeric material at the surface of the article, so that the functional active ingredient is not merely deposited at the surface of the article, but to at least some extent also enters the article at its upper surface and get locked within once the polymer cools after the printing process is over. Suitable organic polymers include e.g. polyester, polyamide, or cellulose acetate.

Conventional transfer media, which do not comprise an additional functional active ingredient as defined herein, i.e. which is not a sublimation dye but may be transferred under similar conditions, are known in the art and are described, for example, in US 2008/0229962 A1 or EP 3 098 085 A1. Transfer media for sublimation printing for various different purposes are commercially available, e.g. under the designation Sihl SubliColor from Sihl GmbH, Dueren, Germany. A sublimation ink typically comprises a sublimation dye dispersed in a liquid carrier. Once the ink is printed onto the sublimation ink receiving layer of a transfer medium, it is desirable that the carrier separates from the dye to facilitate drying without smearing or running, leaving the dye at or near the outer surface of the sublimation ink receiving layer.

A sublimation ink typically comprises a sublimation dye dispersed in a liquid carrier. Once the ink is printed onto the sublimation ink receiving layer of a transfer medium, it is desirable that the liquid carrier separates from the dye to facilitate drying without smearing or running, leaving the dye at or near the outer surface of the sublimation ink receiving layer. It will be appreciated that a sublimation ink or sublimation dye may but does not have to be present in the sublimation ink receiving layer of the present invention.

As used herein, the term "sublimation ink receiving layer" refers to a layer provided over the carrier substrate which is capable of receiving a sublimation ink and later on releasing the sublimation dye upon the application of heat and/or pressure. In order to retain the sublimation dyes at or near the surface of the sublimation ink receiving layer while at the same time allowing an efficient separation and absorption of the liquid carrier, sublimation ink receiving layers usually comprise at least one pigment (sometimes also referred to as filler) and at least one binder. Additives which in contrast to the thermally transferable functional active ingredient described herein essentially remain in the sublimation ink receiving layer during the transfer process may also be included in said layer, such as, but not limited to, sizing agents, surfactants, antifoaming agents, salts, rheology modifiers and/or agents for adjusting the pH of the coating, including buffers, acids and bases. If present, the combined amount of such additives usually does not exceed 10 wt.-% of the total weight of the sublimation ink receiving layer on a dry basis.

In contrast to known transfer media, the sublimation ink receiving layer of the present invention comprises at least one functional active ingredient as defined above which can be transferred from said layer to the surface of an article by means of heat and/or pressure, while the pigment(s) and binder(s) of the sublimation ink receiving layer as well as the further additives described above are essentially retained over the carrier substrate. The term "functional active ingredient" in context of the present invention refers to a substance that imparts one or more functional characteristics to a surface when deposited thereon and/or incorporated therein, which is not a sublimation dye as defined above and which can be transferred to the surface of an article by means of heat and optionally pressure. For example, such desirable properties may include abrasion resistance, scratch resistance, water repellency, UV resistance, electrical conductivity, electrical insulation, printability, weather resistance, oxidation resistance, non-stick/anti-adhesive properties, temperature resistance, oil-repellent properties, dirt-repellent properties, anti-microbial properties, etc. At atmospheric pressure ($1.01325 \times 10^5$ N/m$^2$) the functional active ingredient preferably has a transfer temperature of from 80° C. to 240° C., more preferably of from 90° C. to 220° C., and most preferably of from 120° C. to 180° C. Herein the term "transfer temperature" refers to a temperature specific for each substance at the applied pressure where said substance starts to leave the transfer material, most likely due to sublimation or evaporation. Preferably, the functional active ingredient of the present invention is a solid at room temperature (23° C.) and atmospheric pressure. As it is further described below, the functional active ingredient may be incorporated into the sublimation ink receiving layer during its formation over the carrier substrate or it may be incorporated into a preformed sublimation ink receiving layer.

The functional active ingredients may preferably be selected from the group consisting of bactericides, pesticides, such as herbicides, fungicides or insecticides, antifouling agents, further preservatives, water repellents, oil repellents, dirt repellents, UV stabilizers, antioxidant agents, luminescent agents, brightening agents, reflective agents, polarizing agents, conductive agents, antistatic agents, slip or anti-slip agents, anti-blocking agents, nonstick agents, lubricants, soft touch agents, flavors, fragrances, flame retardants, scratch- and mar-resistant agents, wetting agents, adhesion promoters, sizing agents, roughening agents and mixtures thereof.

Examples of suitable UV stabilizers include e.g. oxanilides, benzotriazoles, and hydroxy benzophenones, such as, for instance Hostavin 3310 (Clariant, Switzerland). Examples of suitable water, oil and dirt repellents include e.g. fluorinated compounds, for instance fluorocarbon resins such as those commercially available under the designation Oleophobol® from Huntsman, Germany, e.g. Oleophobol® 7752. Examples of wetting agents include e.g., Byk 333 (BYK Additives & Instruments, Germany) or Worlee Add 352 (Worlee-Chemie GmbH; Germany); examples of suitable brightening agents include e.g. Tinuvin OB (BASF, Germany); examples of suitable antioxidant agents include e.g. Irganox 1010 (BASF, Germany); and examples of suitable bactericides include Sanitized T99-19 (Sanitized, Switzerland).

The functional active ingredient typically may be present in the sublimation ink receiving layer of the present invention in an amount ranging of from 0.5 to 50 wt.-%, preferably of from 2.5 to 40 wt.-%, more preferably of from 5 to 30 wt.-%, and even more preferably of from 7.5 to 25 wt.-%, based on the combined weight of pigment, binder, and functional active ingredient. The functional active ingredient may be evenly distributed throughout the sublimation ink receiving layer or may be present only at one or more areas of the sublimation ink receiving layer. For example, using the latter embodiment an authenticity watermark or a specific pattern effect can be created on an article with the aid of the functional active ingredient. In addition, the concentration of the functional active ingredient may be the same or vary across the thickness of the sublimation ink receiving layer, e.g. in form of a gradient wherein the amount of functional active ingredient may for instance be higher at or near the surface to be combined with the article in the transfer process than at the opposite surface, i.e. the one facing the carrier substrate.

In terms of the present invention the term "sublimation ink" refers to a composition comprising a sublimation dye in a liquid carrier which is suitable to be applied to a substrate, e.g. the transfer medium of the present invention, by a printing technique, e.g. by ink jet printing. The sublimation dye usually is a solid at room temperature and is dispersed in the liquid carrier of the sublimation ink. Sublimation inks are well known in the art and comprise water-based and organic solvent-based inks, including oil-based inks. More commonly, water-based sublimation inks are used. Sublimation inks and printers for applying them to transfer media are commercially available, e.g. from Mimaki Engineering Co. (Nagano, Japan).

A sublimation dye used in a sublimation ink typically has an absorbance maximum in the visible range, preferably at a wavelength max in the region of from 400 to 700 nm of the electromagnetic spectrum. The absorbance maximum of a sublimation dye can be determined using standard techniques known in the art, e.g. scanning a solution of the dye in a quartz cuvette with a Varian Cary 50 Bio UV-Visible spectrophotometer and the software Varian UV Cary Scan 3.00 (303). The solvent depends on the particular dye to be measured; common solvents include e.g. water, ethanol, toluene, methylene chloride, chloroform, tetrahydrofuran, or dimethylformamide.

Sublimation dyes which can be used with the transfer material of the present invention include those commonly known in the art, such as, but are not limited to, azo dyes, nitro dyes, anthraquinone dyes, quinoline dyes, basic dyes such as triarylmethane dyes, e.g. fluoran dyes, and oil soluble dyes. The sublimation dye of the present invention may have a transfer temperature being in the range of from about 80° C. to about 240° C., preferably of from about 90° C. to about 220° C., and even more preferably of from about 120° C. to about 180° C.

The sublimation ink receiving layer of the present invention further comprises at least one pigment and at least one binder. The pigment and binder hold the functional active ingredient and, if present, a sublimation dye in place and allow the separation and absorption of the liquid carrier from the sublimation dye in the sublimation ink receiving layer.

In terms of the present invention, the term "pigment" is used as known in the art of papermaking and refers to fine particles used in a coating which, in contrast to a dye, do not necessarily impart a color to the coating. Pigments suitable for the sublimation ink receiving layer of the transfer material of the present invention include inorganic particles and organic polymer particles and preferably a combination thereof. The pigment may be porous or non-porous. A combination of porous and non-porous pigments may also be used. As used herein the term "porous" refers to a material which is permeable such that fluids are able to enter the material by way of pores or other passages. The term "porous" further refers to material that have a total pore volume of 1.4 to 1.8 mL/g determined according to ISO 15901-1:2016. Suitable pigments include silica, including amorphous silica, calcined silica, precipitated silica and fumed silica, aluminum oxides and hydroxides, clays, including kaolin and calcined clay, zeolites, calcium carbonate, talc, titanium dioxide, diatomaceous earth, porous glass; polymeric particles preferably having a melting point above 100° C., e.g. (co)poly(meth)acrylates or (co)polyamides such as the (co)polyamide powders available under the designation ORGASOL from Arkema, Colombes, France. The pigments of the present invention preferably may have a volume average particle size ranging of from about 100 nm to about 100 μm, preferably of from about 200 nm to about 75 μm, more preferably of from about 300 nm to about 50 μm and most preferably of from about 500 nm to about 15 μm, determined using a Coulter counter (Multisizer 3, Beckman Coulter Inc., Fullerton, Calif., USA) according to ISO 13319.

Suitable binders for use in a sublimation ink receiving layer are known in the art and include naturally occurring as well as synthetic polymers which may be soluble or insoluble in water at room temperature. It may be preferred to use a mixture of different polymers, including naturally occurring as well as synthetic polymers some of which may be soluble in water at room temperature, while others are not. Such polymers include, but are not limited to, polyvinyl alcohols, casein, gelatin, sodium alginates, chitosans, starches, cellulose esters and ethers, polystyrenes, (meth) acrylic polymers, polyurethanes, polyvinylpyrrolidone and polyvinyl acetates as well as copolymers thereof. As used herein, cellulose ethers include alkyl ethers, such as, for instance, methyl cellulose, ethyl cellulose or ethyl methyl cellulose, hydroxyalkyl cellulose ethers, such as, for instance hydroxyethyl cellulose and hydroxypropyl cellulose, carboxyalkyl cellulose ethers, such as, for instance, carboxymethyl cellulose, as well as mixtures and mixed derivatives thereof, such as, for instance, hydroxyethyl methyl cellulose, hydroxypropyl methyl cellulose and ethyl hydroxyethyl cellulose. A mixture of binders comprising a copolyvinyl alcohol as the main component along with starch, a carboxyalkyl cellulose ether, a polyurethane, a polyacrylate and a polyvinyl acetate may be particularly preferred. The weight ratio of binder to pigment typically may range of from about 100:1 to about 1:1, preferably of from about 60:1 to about 5:1, and more preferably of from about 40:1 to about 10:1. Usually, the binder may account for about 50 to about 95 wt.-%, preferably for about 60 to about 90 wt.-% of the sublimation ink receiving layer of the present invention, based on the dry weight of said layer. Usually, the pigment may account for about 0.5 to about 40 wt.-%, preferably for about 0.75 to about 20 wt.-%, more preferably for about 1.0 to about 10 wt.-% of the sublimation ink receiving layer of the present invention, based on the dry weight of said layer.

In terms of the present invention the term "facing" means that the transfer medium is positioned relative to the article in such a way that the sublimation ink receiving layer is in close proximity to or direct contact with the surface of the article to be provided with the functional active ingredient so that the functional active ingredient can be transferred by heat. The transfer medium can be positioned such that the sublimation ink receiving layer is at a distance from the surface of the article within a range of 0 mm to about 10 mm, preferably 0 mm to about 5 mm, more preferably 0 mm to about 2 mm. In a particularly preferred embodiment, the transfer medium is positioned such that the sublimation ink receiving layer is in direct contact with the surface of the article, i.e. at a distance of 0 mm.

When the sublimation ink receiving layer is brought in close proximity to or in direct contact with the surface of an article, the least one functional active ingredient may be transferred from the sublimation ink receiving layer in the transfer material to the surface of the article by means of heat and optionally pressure. As used herein the term pressure includes both elevated and reduced pressure, i.e. a pressure above or below $1{,}03125 \times 10^5$ N/m$^2$ (1 bar), respectively. The pressure for transferring the functional active agent according to the present invention can be in the range of from 0.1 to 6 bar, preferably of 1 bar. The time for transferring the functional active agent according to the present invention can be in the range of 5 to 240 sec, preferably 20 to 180 sec.

According to the present invention, the pigment(s) and binder(s) of the sublimation ink receiving layer are essentially retained over the carrier substrate while the at least one functional active ingredient of the sublimation ink receiving layer is transferred from the sublimation ink receiving layer to the surface of the article by means of heat and optionally pressure. According to the present invention that means that the pigment(s) and binder(s) are sufficiently retained over the carrier substrate that they are not simultaneously transferred with the functional active ingredient by means of heat and optionally pressure. Preferably more than 95 wt.-% of the pigment(s) and binder(s) are retained, based on the total amount of pigment(s) and binder(s) of the sublimation ink receiving layer, more preferably more than 97 wt.-% and even more preferably more than 98 wt.-%. Most preferably, the pigment(s) and binder(s) of the sublimation ink receiving layer are completely retained over the carrier substrate. Said percentage may be determined by determining the weight of the transfer medium on a precision balance before and after the transfer process, taking into account the weight loss due to the transfer of the functional active ingredient and sublimation dye, if applicable.

In addition to the at least on sublimation ink receiving layer the transfer medium of the present invention optionally may comprise one or more additional layer(s). Said additional layer(s) may for instance be positioned between the carrier substrate and the sublimation ink receiving layer. Alternatively or in addition, such additional layer(s) may be positioned over the surface of the carrier substrate opposite the surface over which the sublimation ink receiving layer(s) is/are formed. Examples of such additional layers include primer layers, barrier layers and layers for improving the heat distribution in the transfer medium.

A primer layer may be used to improve the adhesion between two layers, e.g. between the carrier substrate and the sublimation ink receiving layer, if positioned between them. If present, the primer layer preferably may a thickness ranging of from 2 to 15 µm. Example of a suitable primer layer include, e.g., self-crosslinking acrylic emulsion polymers, such as Neocryl XK98 (DSM, the Netherlands).

One or more barrier layers may be included in the transfer material of the present invention to prevent migration of the functional active ingredient and, if present, sublimation dye, into or through the carrier layer during the thermal transfer process. If present, a barrier layer may be positioned between the carrier substrate and the sublimation ink receiving layer and/or over the surface of the carrier substrate opposite the surface over which the sublimation ink receiving layer(s) is/are formed. A barrier layer may comprises a metal-containing polymer layer, such as e.g. metallized polyethylene terephthalate (PET).

In order to ensure a fast and even distribution of heat over the whole area of the transfer material, a flexible metal layer may be included in the transfer medium of the present invention, preferably over the surface of the carrier substrate opposite the surface over which the sublimation ink receiving layer(s) is/are formed. For instance, such a flexible metal layer may be included by metallizing the respective surface of the carrier material by e.g. physical or chemical vapor deposition (PVD, CVD) or by incorporating a thin flexible metal foil in the transfer material e.g. by means of an adhesive layer or a primer layer. The metal layer may comprise e.g. aluminum.

Using the transfer medium and methods of the present invention, the functional active ingredient and, if present, a sublimation dye being present in the sublimation ink receiving layer are transferred to the surface of an article, but not the whole layer. Accordingly, the transfer medium of the present invention typically does not include a release layer, such as e.g. a silicone coating, to facilitate release of a layer from an underlying layer.

The transfer medium of the present invention may comprise more than one sublimation ink receiving layer, i.e. it may comprise one or more additional sublimation ink receiving layers. Each of these additional sublimation ink receiving layers comprises at least one pigment and at least one binder. The pigment(s) and binder(s) of each additional sublimation ink receiving layer may be independently selected from those described above. Each of these additional sublimation ink receiving layers independently may comprise the same or different functional active ingredient(s) which can be transferred from the sublimation ink receiving layer to an article facing the sublimation ink receiving layer of the transfer medium by means of heat and optionally pressure, while the pigment(s) and binder(s) of the additional sublimation ink receiving layer(s) are retained over the carrier substrate. Alternatively, the additional sublimation ink receiving layer(s) also may comprise no such functional active ingredient. Likewise, each of these additional sublimation ink receiving layers independently may comprise the same or different sublimation dyes as described above or no sublimation dye. If present, the additional sublimation ink receiving layers are located on the same side of the carrier substrate as the first sublimation ink receiving layer and preferably are positioned below and/or above said first sublimation ink receiving layer without any other intermediate layers in between. I.e., if e.g. two sublimation ink receiving layers are present, they are in direct contact with another; if three sublimation ink receiving layers are present, the first one is in direct contact with the second one and the second one is in direct contact with both the first and the third one, etc.

The transfer medium of the present invention preferably may be thermoformable, i.e. it becomes pliable or moldable above a specific temperature (the softening point) and re-solidifies upon cooling. This allows the transfer medium to be stretched and formed into a desired shape, e.g. adapted to the shape of the article to be provided with the functional active ingredient, with the aid of reduced pressure, air pressure and/or mechanical force. This allows an even more precise and accurate transfer of the functional active ingredient and, if present, sublimation dye to the surface of article having a three-dimensional shape and/or textured surface. Thermoforming of the transfer medium may take place while the functional active ingredient is transferred to the surface of said article. In a thermoformable transfer medium according to the present invention, the carrier substrate comprises a thermoplastic polymer. Thermoplastic polymers include, but are not limited to, acrylic polymers, some polyesters and polyurethanes, nylon, polylactic acids, polybenzimidazoles, polycarbonates, polyether sulfones, polyoxymethylenes, polyetherether ketones, polyetherimides, polyethylenes, polyphenylene oxides, polyphenylene sulfides, polypropylenes, polystyrenes, polyvinyl chlorides, and polytetrafluoroethylenes as well as their copolymers and mixtures thereof. Preferably the thermoplastic polymer may be selected from the group consisting of poly(methyl methacrylate) (PMMA), thermoplastic polyurethanes (TPU), polyethersulfones (PES), polyethylene terephthalates (PET), polycarbonates (PC), copolymeric polyoxymethylene (POM-C), acrylonitrile butadiene styrene (ABS), polystyrene (PS) and mixtures thereof.

As already described above, the transfer medium of the present invention may further comprise at least one sublimation ink applied to at least one of the sublimation ink receiving layers, so that in addition to the functional active ingredient a sublimation dye is present in at least one of the sublimation ink receiving layers. If more than one sublimation ink receiving layer is present in the transfer medium, the sublimation ink receiving layer comprising the sublimation dye may comprise the functional active ingredient or, alternatively, it may comprise no such functional active ingredient as long as at least one of the other sublimation ink receiving layers comprises a functional active ingredient.

Further, the present invention relates to a method of preparing the transfer medium of the present invention as described above. The method comprises forming the at least one sublimation ink receiving layer comprising the at least one pigment and at least one binder as well as the functional active ingredient over at least a part of one surface of the carrier substrate. Herein, the functional active ingredient may be included in the sublimation ink receiving layer during its formation or the functional active ingredient may be incorporated into a preformed sublimation ink receiving layer. Accordingly, the method of the present invention may include the steps of applying a coating composition comprising the at least one pigment and at least one binder and the functional active ingredient over at least a part of one side of a carrier substrate to form a coating layer comprising the at least one pigment and at least one binder as well as the functional active ingredient, and drying the coating formed in the previous step.

Alternatively, the method may include the step of applying a coating composition comprising the at least one pigment and at least one binder but not the functional active ingredient over at least one side of a carrier substrate to form a coating layer not comprising the functional active ingredient; drying the layer formed in the previous step, followed by incorporating the functional active ingredient into the dried coating layer.

Suitable carrier substrates, pigments, binders, functional active ingredients as well as further additives that may be incorporated into the coating composition have already been described above. These components are provided, i.e. dissolved or suspended, in a solvent or mixture of solvents. Suitable solvents include water, organic solvents and a mixture thereof. A typical coating composition for forming a sublimation ink receiving layer according to the present invention may comprise e.g. a mixture of from about 50 to about 98 wt.-% water and from about 2 to about 50 wt.-% of one or more alcoholic solvents, including, but not being limited to, one or more of methanol, ethanol, isopropanol, and glycerol, preferably from about 80 to about 95 wt.-% water and from about 2 to about 50 wt.-% of one or more the alcoholic solvents, based on the total amount of both water and organic solvents. The combined amount of solvents in the coating composition typically ranges from about 10 to about 50 wt.-%, preferably from about 20 to about 40 wt.-%, and more preferably from about 25 to about 35 wt.-%, based on the total weight of the coating composition. The preferred amount of pigments, binders, functional active ingredients, if applied with the coating composition, and further additives, if present, in such a coating composition follow from their preferred amounts in the sublimation ink receiving layer as discussed above. A typically coating composition for preparing a sublimation ink receiving layer in accordance with the present invention which includes a water and oil repellant as functional active ingredient is shown in Table 1.

TABLE 1

Coating Composition for Preparing a Sublimation Ink Receiving Layer

| Component | wt.-% |
|---|---|
| Solvents (water, ethanol) | 25-35 |
| Water-soluble binding agents (PVOH, CMC, starch) | 30-50 |
| Further binding agents (PU, acrylate, PVAC) | 1-10 |
| Organic pigments (polyamide) | 1-2 |
| Inorganic pigments (silica) | 0.1-1 |
| Acid | 1-2 |
| Further additives (anti-foaming agent, levelling agent, surfactant) | 0.5-1.5 |
| Functional active ingredient (water and oil repellant) | 15-25 |
| Total | 100 |

The coating composition may be applied over at least one side of a carrier substrate by usual methods known in the art, including, but not limited to, rolling, spraying, curtain coating, brushing, dipping, air knife coating, Mayer rod coating, slot or slide die coating or a combination thereof. After the coating composition has been applied, the coating is dried at room temperature or at an elevated temperature, ranging e.g. from 30° C. to 100° C., optionally using forced air drying. It will be understood that the optimum temperature and duration of the drying step depends on the particular coating, e.g. its solvent content. The temperature for the drying step is usually below the glass transition temperature of the transfer medium. The coating may e.g. be dried at temperatures of up to 60° C. for 40 to 100 sec.

In particular if not already incorporated in the coating composition used for forming the sublimation ink receiving layer, the functional active ingredient may be incorporated into the dried coating layer by applying a solution or dispersion thereof or the neat functional active ingredient in liquid or gaseous form to the dried coating layer. Suitable solvents for forming the solution or dispersion of the functional active ingredient include those discussed above with respect to the coating composition. In principle, the solution or dispersion of the functional active ingredient or the neat in liquid form may be applied using any of the methods mentioned above for applying the coating composition over the carrier substrate. Application by spraying may be preferred. In this particular context spraying also includes ink jet printing of a solution or dispersion comprising the functional active ingredient or the neat in liquid form to the sublimation ink receiving layer. It may be preferred to apply the functional active ingredient and the sublimation dye, if any, to the sublimation ink receiving layer in separate steps, e.g. if they are intended to be applied to different parts of the sublimation ink receiving layer, so that the solution or dispersion comprising the functional active ingredient preferably may be free of a sublimation dye as described above.

Further, at least one sublimation ink comprising a sublimation dye may be applied to the sublimation ink receiving layer obtained as described above. Suitable sublimation inks include those described above. The sublimation ink preferably may be applied by inkjet printing. If the functional active ingredient is incorporated into the dried coating layer in a separate step as described above, the sublimation ink may be applied before, while or after, preferably before or after the functional active ingredient is incorporated.

Moreover, the present invention relates to a method for providing at least a part of a surface of an article with at least one functional active ingredient, wherein the method comprises (i) positioning the transfer medium according to the present invention as described above relative to the article such that the sublimation ink receiving layer most remote from the carrier substrate is facing the surface of the article to be provided with the functional active ingredient, and (ii) applying heat to the transfer medium to transfer the functional active ingredient from the sublimation ink receiving layer to the surface of the article while the pigment(s) and binders(s) of the sublimation ink receiving layer are essentially retained over the carrier substrate.

The method for providing at least a part of a surface of an article with at least one functional active ingredient may further comprise applying at least one sublimation ink comprising a sublimation dye to at least one of the sublimation ink receiving layers before the transfer medium is positioned to face the article in step (i), wherein the sublimation ink preferably is applied by inkjet printing, and transferring the sublimation dye(s) from the sublimation ink receiving layer(s) to at least a part of the surface of the article in order to provide at least a part of the surface with a visible print. Said part of the surface provided with the visible print may be the same as, partially overlapping with or different from the part of said surface provided with the functional active ingredient. The sublimation dye may be transferred together with the at least one functional active ingredient in step (ii), or before or after the at least one functional active ingredient is/has been transferred. Further, the sublimation ink receiving layer from which the functional active ingredient is transferred may be the same or different from the sublimation ink receiving layer from which the sublimation dye is transferred, if more than one sublimation ink receiving layer is present in the transfer material. Herein, the term "visible print" refers to a print that is perceptible to the human eye and may include e.g. letters, words, numbers, symbols, designs, pictures, or a combination thereof.

As explained above, transfer of a substance, whether it is a functional active ingredient or a sublimation dye, takes place, once a temperature specific for each substance at the applied pressure is reached, herein referred to as transfer temperature. Without wishing to be bound by theory, it is believed that at least a portion of the functional active ingredient and the sublimation dye, if present, transitions to the gaseous state and is transferred to the surface of the article in said gaseous state where it re-solidifies upon cooling. However, it cannot be excluded that at least some part of the material is transferred in a liquid state, i.e. a transfer via e.g. set-off also may take place in the method the present invention.

The functional active ingredient can be selected so that it has a higher transfer temperature than the sublimation dye at a specific pressure. In this way, the sublimation dye can be transferred completely or for the most part at a first temperature applied in the transfer process and the functional active ingredient can then be transferred separately at a second temperature applied in the transfer process, which is higher than the first temperature applied in the transfer process. In this way, the functional active ingredient can be transferred over the visible print provided by the sublimation dye to e.g. protect the visible print. For instance, the functional active ingredient may be a UV stabilizer, a water repellent and/or a scratch- and mar resistant agent to protect the visible print may be protected from fading, moisture and/or abrasion.

If it is desired to pre-treat the surface of an article before applying the visible print, the transfer temperature of the functional active ingredient can be selected so that it is lower than the transfer temperature of the sublimation dye. In this way, the functional active ingredient can be transferred completely or for the most part at a first temperature applied in the transfer process and the sublimation dye can then be transferred at a second temperature applied in the transfer process, which is higher than the first temperature applied in the transfer process. For instance, the functional active ingredient may be a wetting agent, an adhesion promoter and/or a roughening agent to improve the adhesion of the sublimation dye to surface of the article.

In the method for providing at least a part of a surface of an article with at least one functional active ingredient, the temperature applied for transferring the functional active ingredient and the sublimation dye, if applicable, may be independently selected to be in the range of from about 100 to about 240° C., preferably from about 120 to about 220° C. and more preferably from about 160 to about 200° C. Further, if more than one functional active ingredient and/or more than one sublimation dye are present, the temperature applied for transferring may be independently selected for each of them. In addition, pressure may be applied during the transfer step, typically being in the range of from 0.1 to 6 bar, preferably 1 bar. Devices for simultaneously applying heat and optionally pressure to the transfer material combined with the article to be provided with the functional active ingredient and the visible print, if applicable, are commercially available and include e.g. heat presses and calenders for essentially flat articles and so-called dye-sub ovens for non-flat articles. Dye-sub ovens usually use either forced hot air or IR technology and employ reduced pressure. Heat and optionally pressure typically are applied for about 5 to about 240 sec, preferably for about 20 to about 180 sec, and even more preferably for about 40 to about 150 sec.

As described above, the surface of the article to be provided with the functional active ingredient comprises a polymeric material. Suitable polymeric materials include the thermoplastic polymers described above. Preferably the surface of the article to be provided with the functional active ingredient comprises a polyester and/or a polyamide. It will be appreciated by a person skilled in the art that the surface of the article to be provided with the functional active ingredient comprises such a polymeric material, but it is not necessary that the whole article is made of said material. Rather the majority of the article may consist of one or more different materials, including e.g. wood, glass, steel, aluminum and other metals or combinations thereof, as long as the surface of the article to be provided with the functional active ingredient comprises a polymeric material.

The article preferably may be selected from the group consisting of textiles and leatherware, including clothing and footwear; luggage items; pieces of furniture and home decor articles; glassware and crockery; household appliances; tools; sanitary items; medical equipment and tools; electrical appliances, including computers and mobile phones; vehicles, including automobiles, motorcycles, bicycles, ships and aircrafts; buildings; toys; jewelries and watches; accessories for and parts of the aforementioned articles; as well as packaging, wrappings and covers, including protective covers. Some examples include e.g. mobile phone back covers, game consoles, keys for a computer keyboard, mugs, casings of a coffee machine, toilet lids, sun shades, bags, suitcases, food wrappings, dashboards, ID cards, table covers, just to name a few.

If the article comprises a thermoplastic material, said thermoplastic material may be formed into a desired shape while the article and the transfer medium are heated in step (ii) of the method for providing at least a part of a surface of an article with at least one functional active ingredient as described above. The thermoplastic material comprises at least one thermoplastic polymer. Suitable and preferred thermoplastic polymers include those described above with respect to the thermoformable carrier substrate.

The invention further relates to the articles having a surface provided with a functional active ingredient and also optionally a visible print made by the method described above.

Further, the present invention also relates to the use of the transfer material and method for providing at least a part of a surface of an article with a functional active ingredient and optionally also a visible print according to the present invention in the field of packaging, including packaging of food; electronics, including consumer electronics; machinery, device and equipment manufacturing; toolmaking; architecture and construction; decoration, including interior decoration; or advertising; or in the domestic or sanitary appliance, automotive, aerospace or textile and clothing industry.

LIST OF REFERENCE SIGNS

3 Carrier substrate
5 Sublimation dye
7 Article to be provided with the functional active ingredient
10 Transfer Medium
2, 12, 13, 14 Sublimation ink receiving layers
15, 16, 17 Functional active ingredient

EXAMPLES

A transfer material comprising a water and oil repellant as functional active ingredient in the sublimation ink receiving layer was prepared by mixing the components shown in Table 1 above to provide a coating composition. The pigment, binder, acid, additive, and functional active ingredient were successively added to the solvent. Said coating composition was applied to a polymer film made of a thermoplastic material as a carrier substrate using a Mayer rod forming the sublimation ink receiving layer (20-40 g/m$^2$) and then dried at 60° C. for 0.9 min. The transfer material thus prepared was then placed over a piece of polyester textile with the sublimation ink receiving layer facing said textile, and placed in heat press. For effecting the transfer, a temperature of 190° C. and a pressure of $2 \times 10^5$ N/m$^2$ were applied to the combination of transfer material and textile in the heat press for 90 sec.

Figure 1:
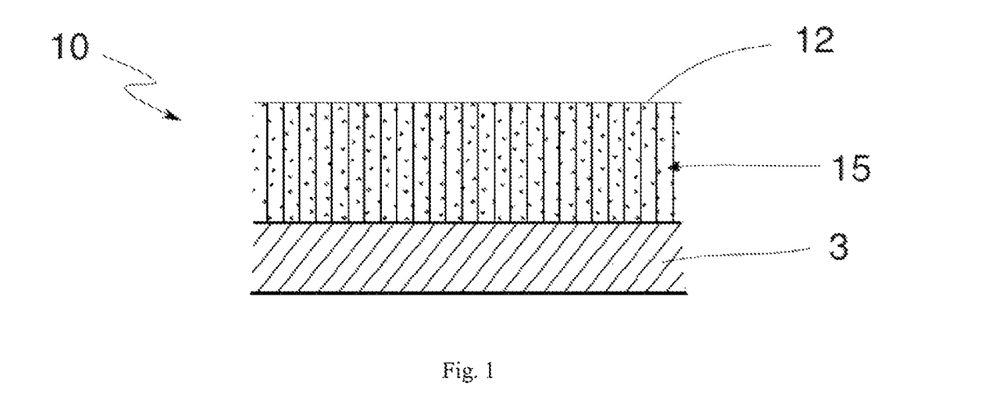
FIG. 1 shows a schematic cross-section of a first exemplary embodiment of a transfer medium 10 according to the present invention. The transfer medium comprises a sublimation ink receiving layer 12, which comprises a functional active ingredient 15 embedded in a mixture of binder and pigment (not explicitly shown), over a carrier substrate 3.
Figure 2:
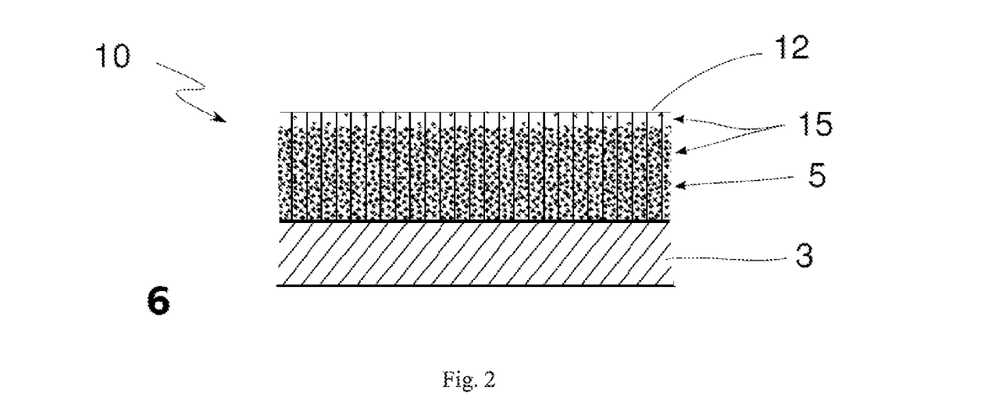
FIG. 2 shows a schematic cross-section of the transfer medium 1 of FIG. 1, after a sublimation ink comprising a sublimation dye 5 has been applied.
Figure 3:
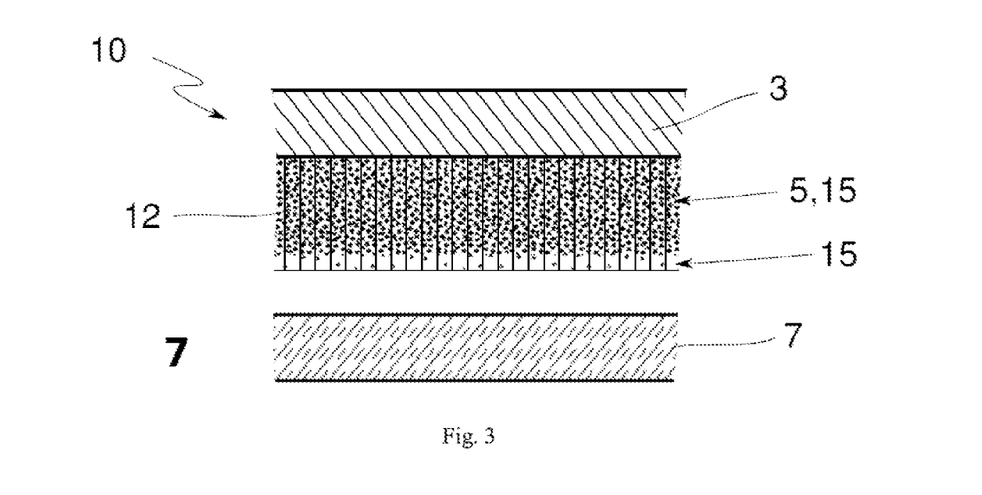
FIG. 3 illustrates how the transfer medium 10 of FIG. 2 is positioned relative to the article 7 such that the sublimation ink receiving layer 12 is facing the surface of the article 7 to be provided with the functional active ingredient 15 and the sublimation dye 5.
Figure 4:
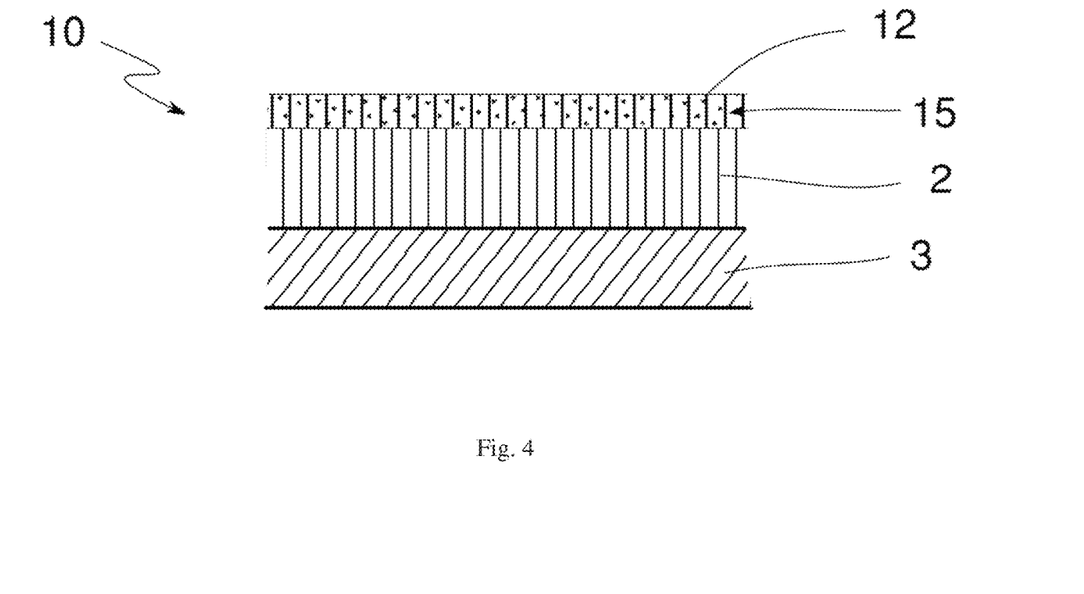
FIG. 4 shows a schematic cross-section of a second exemplary embodiment of a transfer medium 10 according to the present invention, comprising two sublimation ink receiving layers 2, 12 over a carrier substrate 3. In this example, only the upper sublimation ink receiving layer 12 comprises a functional active ingredient 15. If the transfer medium is printed with a sublimation ink, the sublimation dye(s) comprised in said ink will enter both two sublimation ink receiving layers 2, 12. Such an embodiment may be preferred if the functional active ingredient shall be transferred to the surface of an article prior to a sublimation dye, e.g. for pretreating the surface.
Figure 5:
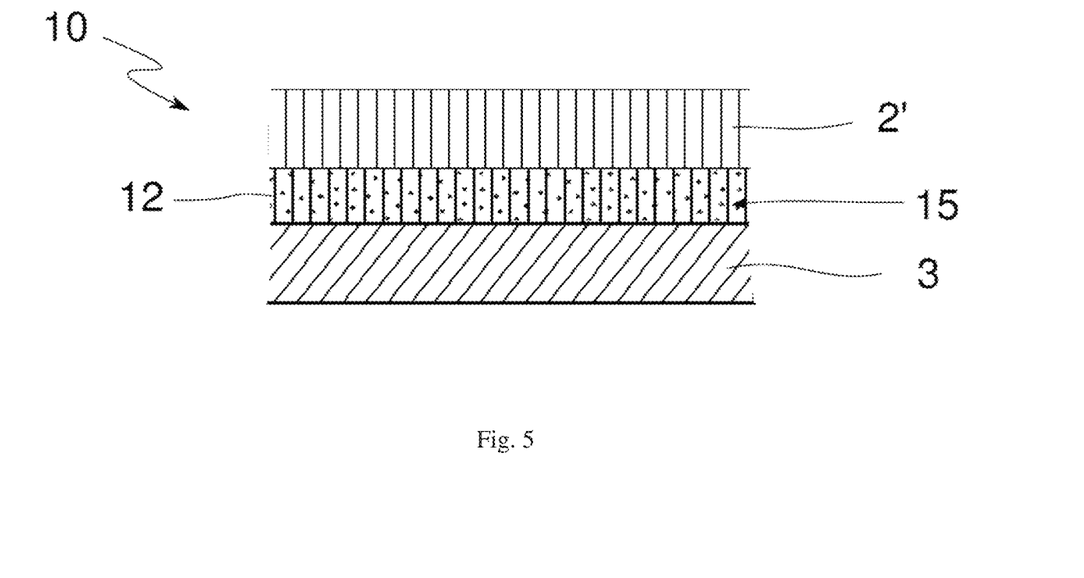
FIG. 5 shows a schematic cross-section of a further exemplary embodiment of a transfer medium 1 according to the present invention, comprising two sublimation ink receiving layers 2, 12 over a carrier substrate 3. In this example, only the lower sublimation ink receiving layer 12 comprises a functional active ingredient 15. Such an embodiment may be preferred if the functional active ingredient shall be transferred to the surface of an article after the sublimation dye, e.g. for protecting the visible print provided by the sublimation dye on the article.
Figure 6:
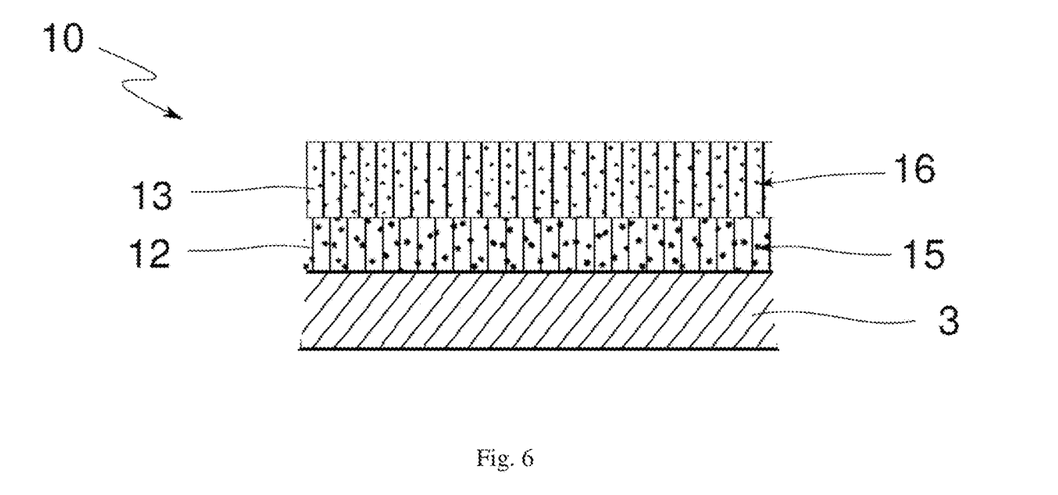
FIG. 6 shows a schematic cross-section of a further exemplary embodiment of a transfer medium 10 according to the present invention, comprising two sublimation ink receiving layers 12, 13 over a carrier substrate 3. In this example, both sublimation ink receiving layers 12, 13 comprise a functional active ingredient 15, 16.
Figure 7:
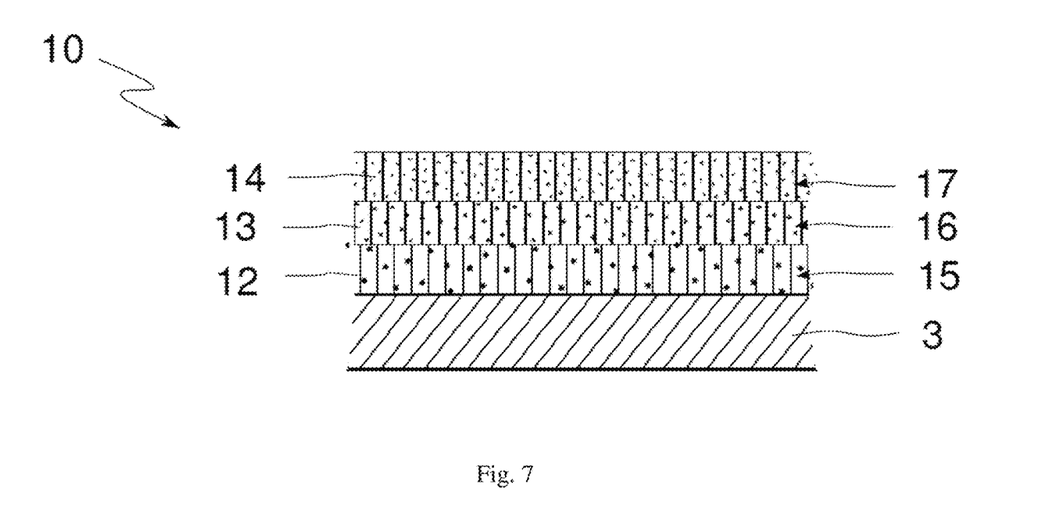
FIG. 7 shows a schematic cross-section of a further exemplary embodiment of a transfer medium 10 according to the present invention, comprising three sublimation ink receiving layers 12, 13, 14 over a carrier substrate 3. In this example, all three sublimation ink receiving layers 12, 13, 14 comprise a functional active ingredient 15, 16, 17.
Figure 8:
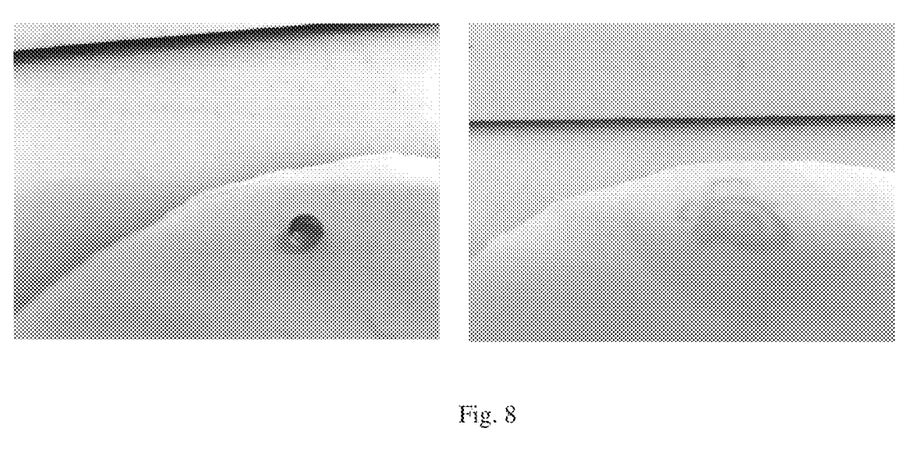
FIG. 8 illustrates the use of a transfer material in accordance with the present invention (left hand side) in comparison to a conventional transfer material (right hand side) known in the art, as further described in the following example.

A water droplet was applied to the textile provided with the functional active ingredient in accordance with the present invention. As can be seen on the left-hand side of FIG. 8, the droplet did not spread or soak into the textile, but remained on the surface thereof, whereas a water droplet placed on a textile made of the same material printed in the same way as described above, except that the transfer material did not include the functional active ingredient was soaked into the material shortly after application (shown on the right-hand side of FIG. 8).

The textile provided with the functional active ingredient was washed several times in a standard washing machine at 30° C. and still exhibited property conferred by the functional active ingredient after the washing processes.

The invention claimed is:

1. A transfer medium for transferring a functional active ingredient to a surface of an article by means of heat, wherein the transfer medium is printable with a sublimation ink and comprises:
    a carrier substrate comprising a material selected from the group consisting of paper, films, nonwovens, textiles and combinations thereof; and at least one sublimation ink receiving layer formed over at least a part of one surface of the carrier substrate, the sublimation ink receiving layer comprising at least one pigment, at least one binder, and at least one functional active ingredient, wherein the at least one functional active ingredient is transferred from the sublimation ink receiving layer to the surface of an article facing the sublimation ink receiving layer of the transfer medium by means of heat while the pigment(s) and binder(s) of the sublimation ink receiving layer are essentially retained in a layer over the carrier substrate, wherein said functional active ingredient does not represent a sublimation dye having an absorbance maximum at a wavelength $\lambda_{max}$ in the region of from 400 to 700 nm of the electromagnetic spectrum.

2. The transfer medium of claim 1, wherein the at least one functional active ingredient is selected from the group consisting of bactericides, pesticides, antifouling agents, further preservatives, water repellents, oil repellents, dirt repellents, UV stabilizers, antioxidant agents, luminescent agents, brightening agents, reflective agents, polarizing agents, conductive agents, antistatic agents, slip or anti-slip agents, anti-blocking agents, nonstick agents, lubricants, soft touch agents, flavors, fragrances, flame retardants, scratch- and mar-resistant agents, wetting agents, adhesion promoters, sizing agents, roughening agents and mixtures thereof.

3. The transfer medium of claim 1, further comprising one or more additional layers positioned between the carrier substrate and the sublimation ink receiving layer and/or over the surface of the carrier substrate opposite the surface over which the sublimation ink receiving layer(s) is/are formed.

4. The transfer medium of claim 1, further comprising one or more additional sublimation ink receiving layers each comprising at least one pigment and at least one binder, wherein each of these additional sublimation ink receiving layers independently may comprise the same or different functional active ingredient(s) which can be transferred from the sublimation ink receiving layer to an article facing the sublimation ink receiving layer of the transfer medium, by means of heat, while the pigment(s) and binder(s) of the additional sublimation ink receiving layer(s) are retained in layer(s) over the carrier substrate, or where the additional sublimation ink receiving layer(s) comprise(s) no such functional active ingredient.

5. The transfer medium of claim 1, wherein the transfer medium is thermoformable.

6. The transfer medium of claim 1, further comprising at least one sublimation ink applied to at least one of the sublimation ink receiving layers.

7. A method for preparing the transfer medium of claim 1 comprises forming the at least one sublimation ink receiving layer comprising the at least one pigment, the at least one binder, and the at least one functional active ingredient over at least the part of one surface of the carrier substrate by:
- (i-a) applying a coating composition comprising the at least one pigment, the at least one binder, and the at least one functional active ingredient over at least a part of one side of the carrier substrate to form a coating layer comprising the at least one pigment, the at least one binder, and the at least one functional active ingredient, and
- (i-b) drying the coating formed in step (i-a); or
- (ii-a) applying a coating composition comprising the at least one pigment and at least one binder but not the at least one functional active ingredient over at least one side of the carrier substrate to form a coating layer not comprising the at least one functional active ingredient;
- (ii-b) drying the layer formed in step (ii-a); and
- (ii-c) incorporating the at least one functional active ingredient into the dried coating layer obtained in step (ii-b).

8. The method of claim 7, wherein in step (ii-c) the at least one functional active ingredient is incorporated into the dried coating layer by applying a solution or dispersion comprising the functional active ingredient or the neat functional ingredient in liquid or gaseous form to the dried coating layer.

9. A method for providing at least a part of a surface of an article with at least one functional active ingredient comprising:
- (i) positioning the transfer medium according to claim 1 relative to the article such that the sublimation ink receiving layer most remote from the carrier substrate is facing the surface of the article to be provided with the at least one functional active ingredient; and
- (ii) applying heat to the transfer medium to transfer the at least one functional active ingredient from the sublimation ink receiving layer to the surface of the article while the pigment(s) and the binders(s) of the sublimation ink receiving layer are essentially retained in a layer over the carrier substrate.

10. The method of claim 9, further comprising:
applying at least one sublimation ink comprising a sublimation dye to at least one of the sublimation ink receiving layers before the transfer medium is positioned to face the article in step (i), wherein the sublimation ink preferably is applied by inkjet printing, and transferring the sublimation dye(s) from the sublimation ink receiving layer(s) to at least a part of the surface of the article in order to provide at least a part of the surface with a visible print, wherein the part of the surface provided with the visible print may be the same as, partially overlapping with or different from the part of said surface provided with the at least one functional active ingredient, the sublimation dye may be transferred together with the at least one functional active ingredient in step (ii) or before or after the at least one functional active ingredient is transferred, and the sublimation ink receiving layer from which the at least one functional active ingredient is transferred may be the same or different from the sublimation ink receiving layer from which the sublimation dye is transferred, if more than one sublimation ink receiving layer is present in the transfer medium.

11. The method of claim 9, wherein the temperature applied for transferring the at least one functional active ingredient is selected to be in the range of from 100 to 240° C.

12. The method of claim 9, wherein the surface of the article to be provided with the at least one functional active ingredient comprises a polymeric material; and/or wherein the article is selected from the group consisting of textiles and leatherware, including clothing and footwear; luggage items; pieces of furniture and home decor articles; glassware and crockery; household appliances; tools; sanitary items; medical equipment and tools; electrical appliances, including computers and mobile phones; vehicles, including automobiles, motorcycles, bicycles, ships and aircrafts; buildings; toys; jewelries and watches; accessories for and parts of the aforementioned articles; as well as packaging, wrappings and covers, including protective covers.

13. The method of claim 9, wherein the article comprises a thermoplastic material which is formed into a desired shape while the article and the transfer medium facing the article are heated in step (ii).

14. An article having a surface provided with at least one functional active ingredient and optionally also a visible print according to the method of claim 9.

15. The transfer medium of claim 3, wherein the additional layers are selected from the group consisting of primer layers, barrier layers and layers for improving the heat transfer in the transfer medium.

16. The method of claim 8, wherein in step (ii-c) the at least one functional active ingredient is applied by spraying.

17. The method of claim 10, wherein the temperature applied for transferring the sublimation dye is selected to be in the range of from 100 to 240° C.

18. The method of claim 12, wherein the surface of the article to be provided with the at least one functional active ingredient comprises a polyester and/or a polyamide.

19. The method of claim 9, further comprising providing a visible print in the field of packaging, including packaging of food; electronics, including consumer electronics; machinery, device and equipment manufacturing; toolmaking; architecture and construction; decoration, including interior decoration; or advertising; or in the domestic and sanitary appliance, automotive, aerospace or textile and clothing industry.

* * * * *